(12) United States Patent
Shmukler et al.

(10) Patent No.: US 11,252,250 B1
(45) Date of Patent: Feb. 15, 2022

(54) SYSTEM, METHOD, AND COMPUTER PROGRAM FOR MANAGING A PLURALITY OF HETEROGENEOUS SERVICES AND/OR A PLURALITY OF HETEROGENEOUS DEVICES LINKED TO AT LEAST ONE CUSTOMER

(71) Applicant: Amdocs Development Limited, Limassol (CY)

(72) Inventors: Jonathan Shmukler, Ra'ananna (IL); Hadar Sharon, Hod Hasharon (IL); Tal Chava Zamir, Kiryat Ono (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 16/136,067

(22) Filed: Sep. 19, 2018

Related U.S. Application Data

(60) Provisional application No. 62/562,271, filed on Sep. 22, 2017.

(51) Int. Cl.
| | |
|---|---|
| G06F 15/16 | (2006.01) |
| G06F 9/54 | (2006.01) |
| H04L 29/06 | (2006.01) |
| H04L 29/08 | (2006.01) |
| H04W 4/70 | (2018.01) |

(52) U.S. Cl.
CPC ........ H04L 67/2838 (2013.01); H04L 63/083 (2013.01); H04L 63/0861 (2013.01); H04L 67/10 (2013.01); H04L 67/125 (2013.01); H04L 67/16 (2013.01); H04L 67/18 (2013.01); H04L 67/303 (2013.01); H04W 4/70 (2018.02)

(58) Field of Classification Search
CPC .............. H04L 67/2838; H04L 63/083; H04L 63/0861; H04L 67/10; H04L 67/125; H04L 67/16; H04L 67/18; H04L 67/303; H04W 4/70
USPC ....................................................... 709/223
See application file for complete search history.

(56) References Cited

U.S. PATENT DOCUMENTS

| | | | |
|---|---|---|---|
| 9,276,942 B2* | 3/2016 | Srinivasan | .............. H04L 63/10 |
| 2002/0107810 A1* | 8/2002 | Nishio | .................... G06Q 30/02 |
| | | | 705/59 |
| 2006/0109837 A1* | 5/2006 | Saha | ................. H04L 29/06027 |
| | | | 370/352 |
| 2006/0185004 A1* | 8/2006 | Song | ................... H04L 63/0815 |
| | | | 726/8 |
| 2007/0233540 A1* | 10/2007 | Sirota | .................... H04L 63/105 |
| | | | 705/7.25 |
| 2009/0132698 A1* | 5/2009 | Barnhill, Jr. | ........ H04L 12/2809 |
| | | | 709/224 |
| 2010/0214090 A1* | 8/2010 | Sartini | .................... H04L 51/04 |
| | | | 340/517 |
| 2011/0093929 A1* | 4/2011 | Li | .......................... H04L 47/10 |
| | | | 726/4 |

(Continued)

*Primary Examiner* — Hamza N Algibhah
(74) *Attorney, Agent, or Firm* — Zilka-Kotab, P.C.

(57) ABSTRACT

A system, method, and computer program product are provided for managing a plurality of heterogeneous services and/or a plurality of heterogeneous devices linked to at least one customer. In operation, a system links a customer identifier associated with at least one customer with one or more of a plurality of heterogeneous services and/or a plurality of heterogeneous devices. Moreover, the system manages the plurality of heterogeneous services and/or the plurality of heterogeneous devices linked to the customer(s).

17 Claims, 12 Drawing Sheets

(56) References Cited

U.S. PATENT DOCUMENTS

| | | | |
|---|---|---|---|
| 2011/0154464 A1* | 6/2011 | Agarwal | H04L 63/0815 726/8 |
| 2012/0023556 A1* | 1/2012 | Schultz | G06F 21/41 726/4 |
| 2013/0151242 A1* | 6/2013 | Kim | H04M 3/568 704/201 |
| 2014/0075565 A1* | 3/2014 | Srinivasan | H04L 41/5054 726/26 |
| 2014/0098670 A1* | 4/2014 | Choi | H04W 28/08 370/235 |
| 2014/0280196 A1* | 9/2014 | Jung | H04L 67/02 707/741 |
| 2014/0280932 A1* | 9/2014 | Braun | H04L 63/10 709/225 |
| 2014/0325620 A1* | 10/2014 | Samson | H04L 63/20 726/5 |
| 2014/0359488 A1* | 12/2014 | Bahna | G06F 16/9562 715/760 |
| 2015/0154588 A1* | 6/2015 | Purves | G06Q 30/0226 705/14.27 |
| 2016/0359849 A1* | 12/2016 | Nakajima | H04L 63/0853 |
| 2016/0381001 A1* | 12/2016 | Li | H04L 63/0815 713/155 |
| 2017/0208060 A1* | 7/2017 | Hanifen | G06F 16/24573 |
| 2017/0295197 A1* | 10/2017 | Parimi | H04L 67/10 |
| 2017/0295447 A1* | 10/2017 | Tegegne | H04W 4/50 |
| 2017/0353444 A1* | 12/2017 | Karangutkar | H04L 63/102 |
| 2018/0052987 A1* | 2/2018 | Tada | H04L 63/10 |
| 2018/0234509 A1* | 8/2018 | Shah | G06F 16/957 |
| 2018/0309748 A1* | 10/2018 | Li | H04L 63/0815 |
| 2019/0018870 A1* | 1/2019 | Bhagwat | G06F 16/256 |

\* cited by examiner

SYSTEM, METHOD, AND COMPUTER PROGRAM FOR MANAGING A PLURALITY OF HETEROGENEOUS SERVICES AND/OR A PLURALITY OF HETEROGENEOUS DEVICES LINKED TO AT LEAST ONE CUSTOMER

CLAIM OF PRIORITY AND RELATED APPLICATIONS

This application claims the benefit of U.S. Provisional Application No. 62/562,271, filed Sep. 22, 2017, the entire contents of which are incorporated herein by reference.

FIELD OF THE INVENTION

The present invention relates to managing a plurality of heterogeneous services and/or a plurality of heterogeneous devices linked to at least one customer.

BACKGROUND

Currently, there are no systems or platforms for managing a plurality of heterogeneous services and/or a plurality of heterogeneous devices linked to at least one customer in an efficient manner.

There is thus a need for addressing these and/or other issues associated with the prior art.

SUMMARY

A system, method, and computer program product are provided for managing a plurality of heterogeneous services and/or a plurality of heterogeneous devices linked to at least one customer. In operation, a system links a customer identifier associated with at least one customer with one or more of a plurality of heterogeneous services and/or a plurality of heterogeneous devices. Moreover, the system manages the plurality of heterogeneous services and/or the plurality of heterogeneous devices linked to the customer(s).

DETAILED DESCRIPTION

Figure 1:
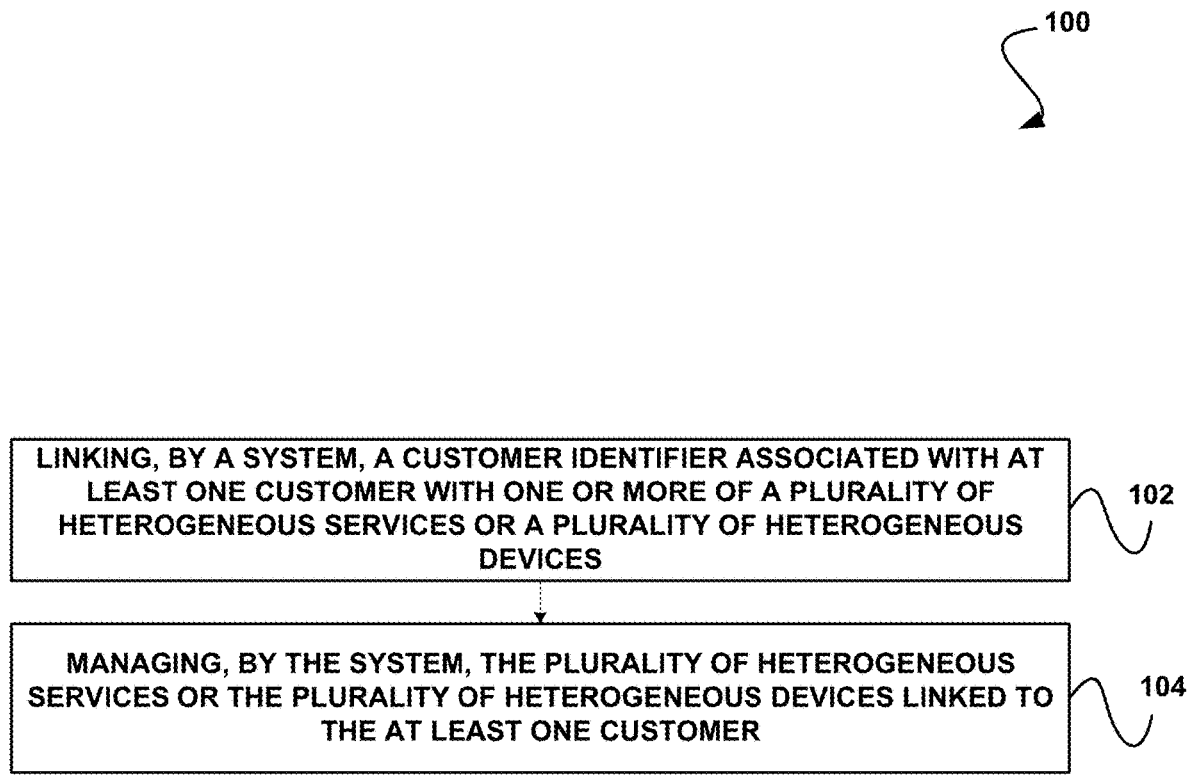
FIG. 1 illustrates a method for managing a plurality of heterogeneous services and/or a plurality of heterogeneous devices linked to at least one customer, in accordance with one embodiment.

FIG. 1 illustrates a method 100 for managing a plurality of heterogeneous services and/or a plurality of heterogeneous devices linked to at least one customer, in accordance with one embodiment.

In operation, a system links a customer identifier associated with at least one customer with one or more of a plurality of heterogeneous services and/or a plurality of heterogeneous devices. See operation 102. The customer identifier may include any object capable of identifying the customer or user, such as a username, password, and/or biometric information, etc. A customer may refer to any user.

The services may include any type of services, such as television services, Internet services, streaming media services (e.g. streaming video, streaming audio, etc.), gaming services, security services, and/or various other types of services. The devices may include any type of device, such as connected home devices, security devices, mobile phones, tablet computers, computers, vehicles, and/or various other devices.

The system manages the plurality of heterogeneous services and/or the plurality of heterogeneous devices linked to the customer(s). See operation 104. The system may also be utilized for managing multiple locations (e.g. houses, businesses, areas, etc.) with heterogeneous services, devices, and users. The system may manage the services and the devices, as well as locations of such services and devices. For example, the system may link one or more locations (e.g. a first house, a second house, a business, etc.) to the plurality of heterogeneous services and the plurality of heterogeneous devices linked to the at least one customer.

Management may include managing user(s) access to the services/devices/locations, managing licensing aspects associated with the services/devices/locations, managing fees associated with the services/devices/locations, managing advertisements associated with the services/devices/locations, managing entitlements associated with the services/devices/locations and/or various other management.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
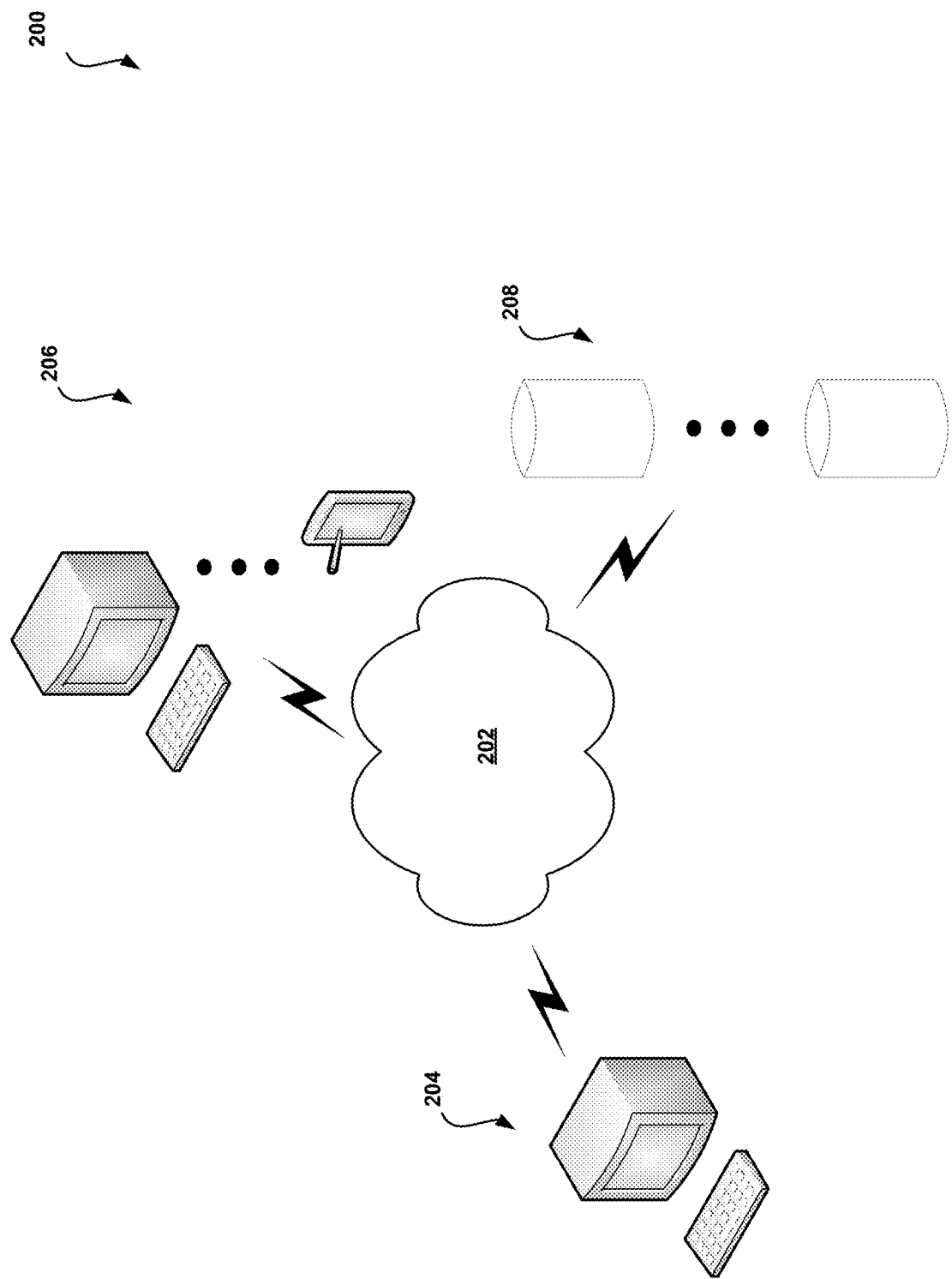
FIG. 2 shows a system for managing a plurality of heterogeneous services and/or a plurality of heterogeneous devices linked to at least one customer, in accordance with one embodiment.

FIG. 2 shows a system 200 for managing a plurality of heterogeneous services and/or a plurality of heterogeneous devices linked to at least one customer, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a management system 204, which may implement a variety of applications or software, etc. The management system 204 may be capable of communicating with a plurality of systems/devices 206, either directly or over one or more networks 202, for managing such devices and/or various services/profiles associated with such devices. The management system 204 may also be in communication with one or more repositories/databases 208.

The management system 204 may be utilized for managing a plurality of heterogeneous services and policies, per user, by linking at least one customer ID associated with a customer with one or more of the plurality of services and policies. In another embodiment, the management system 204 may be utilized for managing a plurality of heterogeneous devices, services and policies per user by linking at least one customer ID associated with a customer with one or more of the heterogeneous devices. The management system 204 may also be utilized for managing multiple locations (e.g. houses, businesses, areas, etc.) with heterogeneous services, devices, and users.

Figure 3:
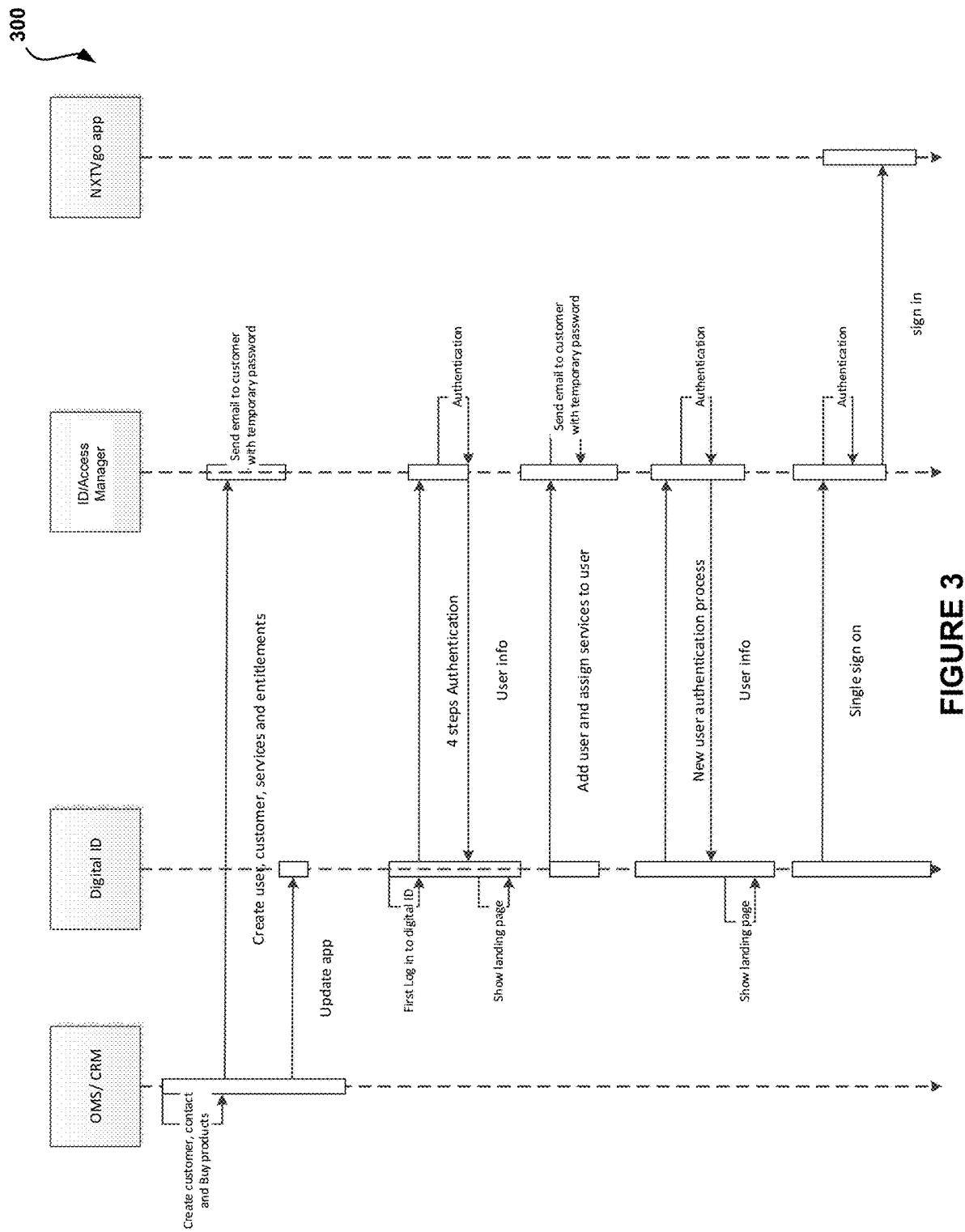
FIG. 3 shows a system flow diagram for managing a plurality of heterogeneous services and/or a plurality of heterogeneous devices linked to at least one customer, in accordance with one embodiment.

FIG. 3 shows a system flow diagram 300 for managing a plurality of heterogeneous services and/or a plurality of heterogeneous devices linked to at least one customer, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

In operation, an OMS/CRM system creates a customer profile, etc. In response to this, an ID/Access Manager system sends a message with a temporary password. The OMS/CRM system creates a user, customer, services and entitlements. Upon an attempted login to an application/service, etc., by a user, the ID/Access Manager performs an authentication. If the user wants to add another user to a profile and assign services, the ID/Access Manager sends a temporary password to the new user. The ID/Access Manager then generates a new user authentication process. The users may then sign in to the service/application utilizing a single sign on.

Figure 4:
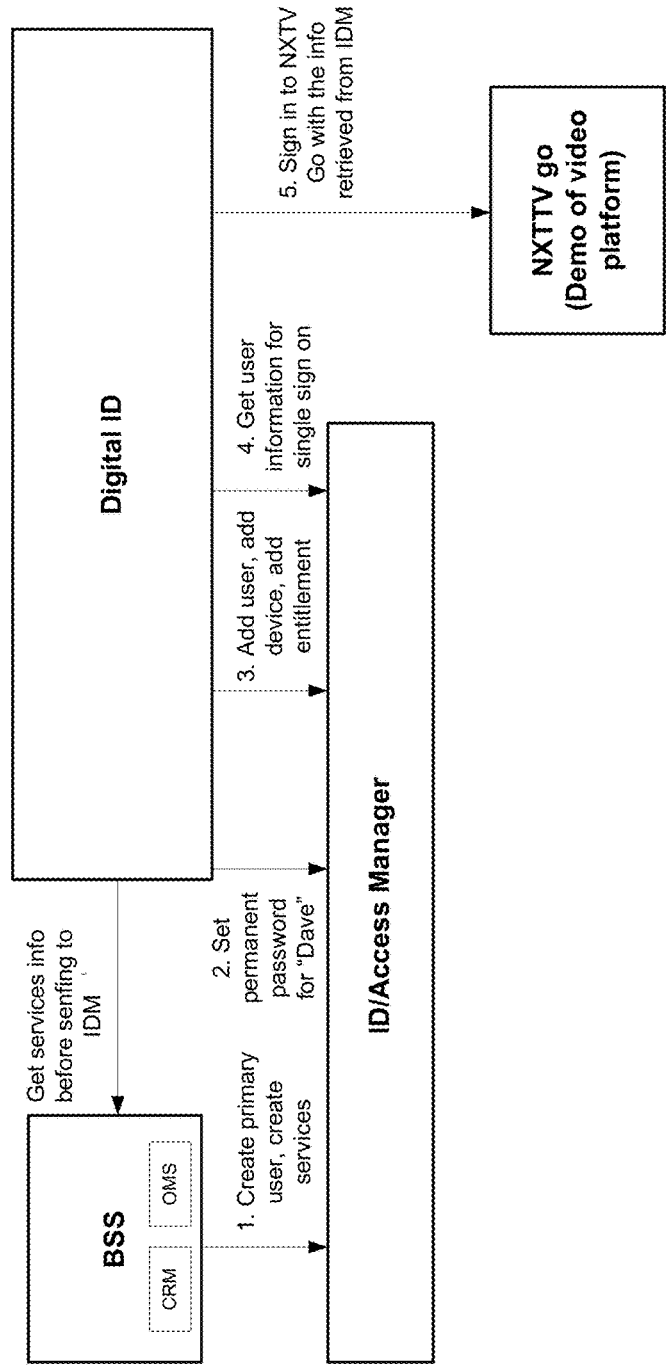
FIG. 4 shows a system flow diagram for managing a plurality of heterogeneous services and/or a plurality of heterogeneous devices linked to at least one customer, in accordance with one embodiment.

FIG. 4 shows a system flow diagram 400 for managing a plurality of heterogeneous services and/or a plurality of heterogeneous devices linked to at least one customer, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

As shown, a primary user and primary services are created. See step 1. The permanent password is set for the primary user. See step 2. A user, device, and entitlement are then added. See step 3. Information for a single sign on is then obtained. See step 4. A user then signs into a service with information retrieved from the ID/Access Manager system. See step 5.

In use, the digital ID application is integrated with the ID/Access Manager system. The integration may demonstrate user management, authentication and entitlement management, including the following use cases: create user, customer and services in BSS and in the ID/Access Manager system; log in to digital ID with the user created in BSS authentication; primary user adding child user in digital ID application, and assigns services (the entities may be created in the ID/Access Manager system); child user log in first time to the digital ID application; and single sign in to the service application (e.g. NXTV go app, etc.) with a few users.

For the video platform, a single sign in to a real video platform application may be implemented, along with buy promotions (e.g. using Vindicia, etc.). This may include the following use cases: buying OVP from BSS or the digital ID application; creating users in the ID/Access Manager system and OVP application; a single sign on to the OVP via the ID/Access Manager system; display promotions in the OVP; buy promotions in the OVP; and promotion system (e.g. Vindicia, etc.) integration to pay for promotions.

In one embodiment, digital ID applications and service applications (e.g. NXTV go apps, etc.) may be transformed to a web application in order to allow the single sign on. Additionally, for single sign in, the digital ID application and the service application (e.g. the NXTV go app, etc.) may be located in the same domain. Further, every time the first order is created for a new customer in CRM, the digital ID app may be updated with the new customer data.

In one embodiment, as an example, a master enterprise catalog (MEC) may create the following offers for the platform (all under the category of a single offer): NXTTV silver, NXTV go, NXT mobile plan, NXT home Internet, and NXT Smart home.

In the system, each assigned product of a smart home may create a service in the ID/Access Manager system. In one embodiment, each smart home device in, for example, OMS (e.g. camera, home alarm, lights, etc.) may be a service in the ID/Access Manager system, since for each device there may be different entitlements.

For each of the offers, as an example, the MEC may add attributes including service code, which may be unique for each one of the five offers above (e.g. string, no gaps, etc.), and may be used by the ID/Access Manager system to identify service related processes. The MEC may use the attribute of FixProductID. For TV, the default value may be TVSERVICE. For smart home, the default value may be SMARTHOME. For wireless, the default value may be MOBILE. For NXTV go, the default value may be NXTV. For Internet, the default value may be INTERNET.

With respect to the max number of users, since each offer may be different, the user may pay for an additional number of users. The ID/Access Manager system may use this in order to restrict the number of entitlements for each service.

TABLE 1

| Offer | Max number of user | Description | MEC location of the attribute max number of users |
|---|---|---|---|
| NXT TV silver | 1 | No need to show on the screen | On the main component and invisible |

TABLE 1-continued

| Offer | Max number of user | Description | MEC location of the attribute max number of users |
|---|---|---|---|
| NXTV go | 2, 3,4 | Default 2, and the user can change, each additional user add 5 dollars | On the TV Stream Users component |
| NXT mobile plan | 1 | No need to show on the screen | On the main component and invisible |
| NXT home Internet | 20 | No need to show on the screen | On the main component and invisible |
| NXT Smart home | 20 | No need to show on the screen | On the main component and invisible |

In one embodiment, an ID/Access Manager system indicator may be implemented. Based on this indicator, an ordering system may decide whether to create the service in the ID/Access Manager system, where all the offers above may have the indicator set to yes.

Further, in one embodiment, the system may automatically assign the service to a primary user (e.g. an attribute with value yes/no, etc.). This may be a new attribute on the level of the offer that will indicate whether, by default, to assign the service to a primary user, or that it will not be assigned automatically, and the user may be able to assign it in the digital ID application.

For example, if a user buys a service to a streaming media application (e.g. Pandora, etc.), and it has only one user, then the entitlement for this service may not be created immediately, but only when the user logs in to the digital ID application will the user be able to be defined for this service.

Figure 5:
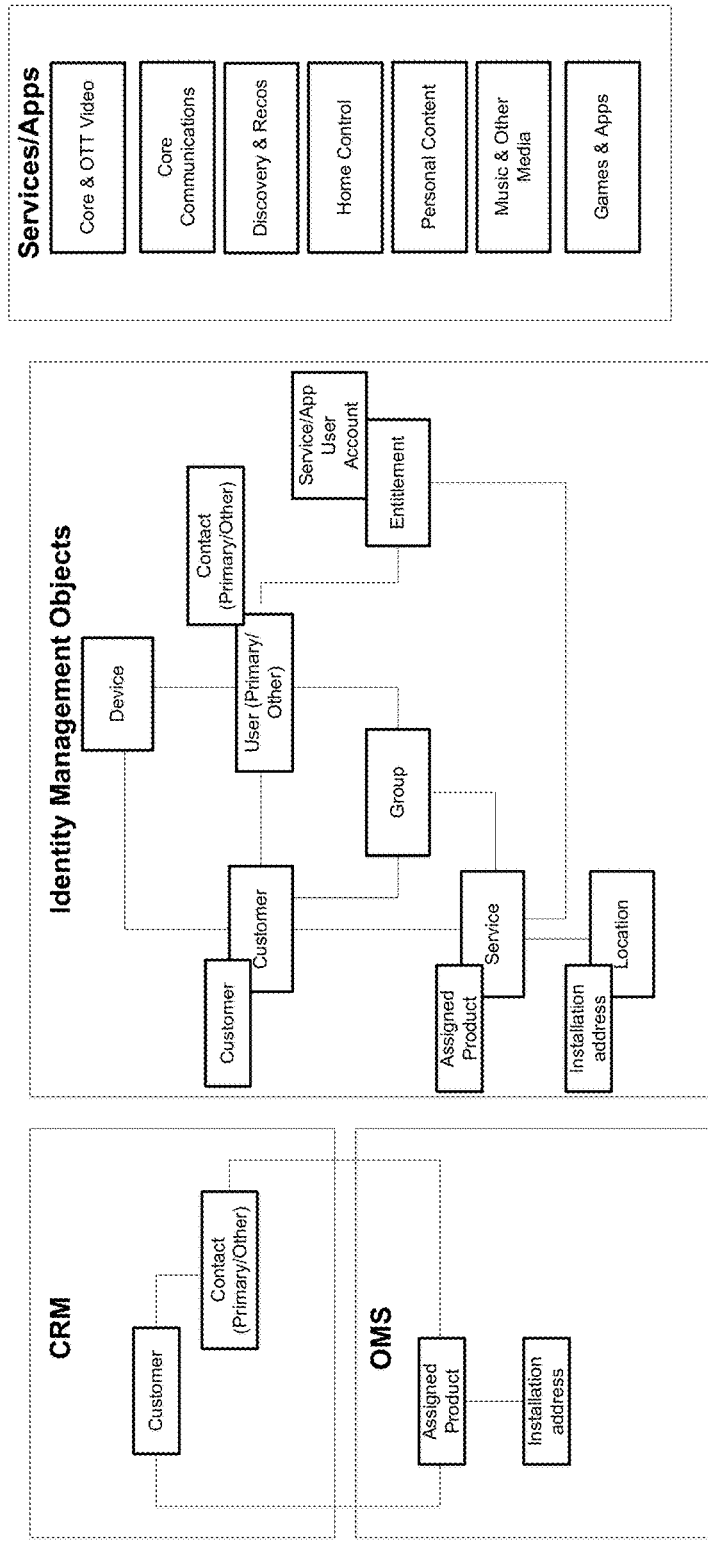
FIG. 5 shows a system flow diagram for object model mapping in an ID/Access Manager system, in accordance with one embodiment.

FIG. 5 shows a system flow diagram 500 for object model mapping in an ID/Access Manager system, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

The following objects may be created in the ID/Access Manager system: Customer (mapped to customer in CRM); User; Service (mapped to AP in, for example, OMS); Entitlement (e.g. generated by the IDM each time a user is created and assigned to a service or when a user is updated to assigned/removed from a service); Role (generated by IDM); Group, which may be used to create a group of users and connect entitlements to all the users in the group; Device (mapped to device); and Location, which may be used to create a location and connect service to this location.

Customer may include ID (CRM Customer ID) and Name. User may include: ID—generated by IDM; User Name—email address (must be unique); Password—generated by IDM; First Name; Last Name, Email address—allocated with the user name; Phone Number; Address; Birthday; Role—primary user may be mapped to "Parent" from the digital ID app as a screen input (based on this field, the manage service link may be enabled or disabled in the digital ID app); Status—active (always); and Relationship fields such as Services (e.g. an array of service IDs, according to this field the entitlements are generated by the IDM) and Customer ID.

Service may include: ID—OMS AP ID; Service Code (new filed, for example, in MEC see table); Name; Max number of allowed users (new filed in MEC); IDM indicator (set by MEC)—indicates that the service needs to be sent to the IDM; Phone number—updated from, for example, OMS in order to differentiate the different mobile services, which may have a value in case of mobile only; and Relationship fields such as Customer ID and Location (mapped to installation address in, for example, OMS), when service is created need to create the location.

Entitlement may include: ID—generated by the IDM; Name—generated by the IDM; and Relationship fields such as Service ID, which stores the code and name of the service.

Role may include: Parent, which can create new users for the same customer and can assign entitlements to users from customer entitlements; and Child, which can only login and access entitled applications.

Group may include Group ID (e.g. generated by the IDM); and Group name (e.g. customer input in digital ID app). Relationship fields may include: User (0 . . . n); Service (0 . . . n); and Customer (1). Device may include: Device name; and Relationship field such as User and Customer. Location may include Location ID; Location name—user input in CRM (address) can be changed in Digital ID; and Relationship field (e.g. Service).

The following relationships are generated by the ID/Access Manager system: Customer—User relationship; Customer—service relationship; User—Entitlement relationship; and Service—Entitlement relationship.

Additional relationships that may be generated may include: User—device, which may be created when user connects a device to a customer in digital ID; Customer—device, which may be created when customers buy a device in, for example, OMS; Customer—group, which may be created when primary users create a group in digital ID; Group—user, which may be created when a user is assigned to a group in digital ID; Group—service, which may be created when a service is assigned to the group, and automatically may create a relationship between each user in this group to the service; and Service—Location, which may be created in ordering when a service address is created on an assigned product.

In operation, the solution for managing a plurality of heterogeneous services and/or a plurality of heterogeneous devices linked to at least one customer includes the system creating a customer and contact in the CRM. Services may be provided in, for example, OMS. The object structure is created in the ID/Access Manager system for the identity manager. A user can go to the ID/Access Manager system to view this structure.

The user will receive an email with a temporary password for the digital application. The user can open the digital ID application and insert the temporary password to start the authentication steps. In one embodiment, the authentication steps may include: checking the temporary password; allowing the system to resend an email with a new temporary password; checking if the device is registered, and if not, registering the device; the user inserting a permanent password, saving the password in the ID/Access Manager system; and selecting a picture for this user.

The new user may log into the digital ID application. The system may show the links of the user based on the entitlements in the ID/Access Manager system. The system may also show a link to manage "my NXTV" (e.g. perhaps only if the user is a primary user). When clicking on a "manage my user" screen, the user data (services and users) may be updated based on the data in the ID/Access Manager system.

For a single sign in to the NXTV go application, the application may not require a password, since it is using authentications steps of the digital ID. Integration may be via the ID/Access Manager system gateway.

In one embodiment, primary users may create secondary users. This may include: inserting new customer information; selecting services; creating user and entitlements in the ID/Access Manager system (e.g. users get email with temporary password); viewing user information in the user screen (primary users manage secondary users); and logging out with the primary user.

When logging in with a secondary user, the authentication steps may include: checking the temporary password; checking whether the device is registered (if not register it); the user inserting a permanent password and saving the password in the ID/Access Manager system; and selecting picture for this user.

The new user view will include links to the services. Single sign in to the NXTV go application with a new user will not require a password, since it is using authentications steps of the digital ID.

For each order action that is created, an ordering system will call as part of finalize order activity to the ID/Access Manager system in order to create the object model in the ID/Access Manager system.

Figure 6:
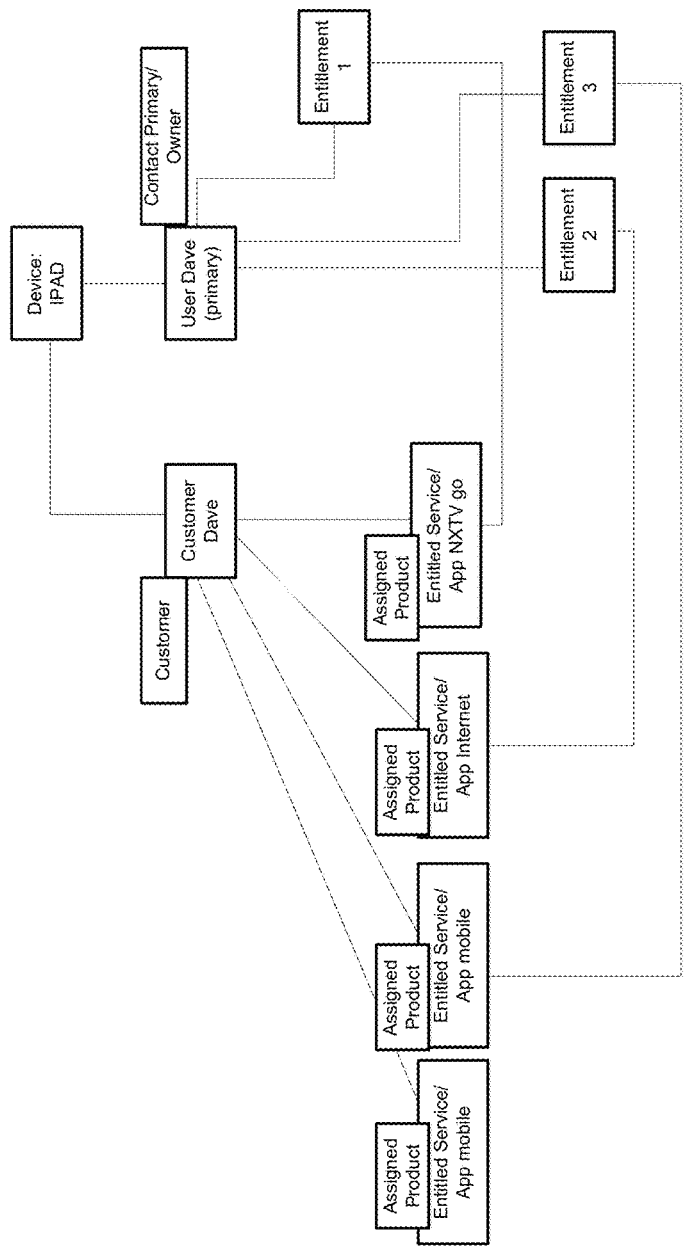
FIG. 6 shows an example of a created object model in a system, in accordance with one embodiment.

FIG. 6 shows an example 600 of a created object model in a system, in accordance with one embodiment. As an option, the example 600 may be implemented in the context of the details of the previous figures and/or any subsequent figure(s). Of course, however, the example 600 may be implemented in the context of any desired environment. Further, the aforementioned definitions may equally apply to the description below.

The example 600 shows an object model created in the case that two mobiles, one TV, and one NXTVgo are provided.

Figure 7:
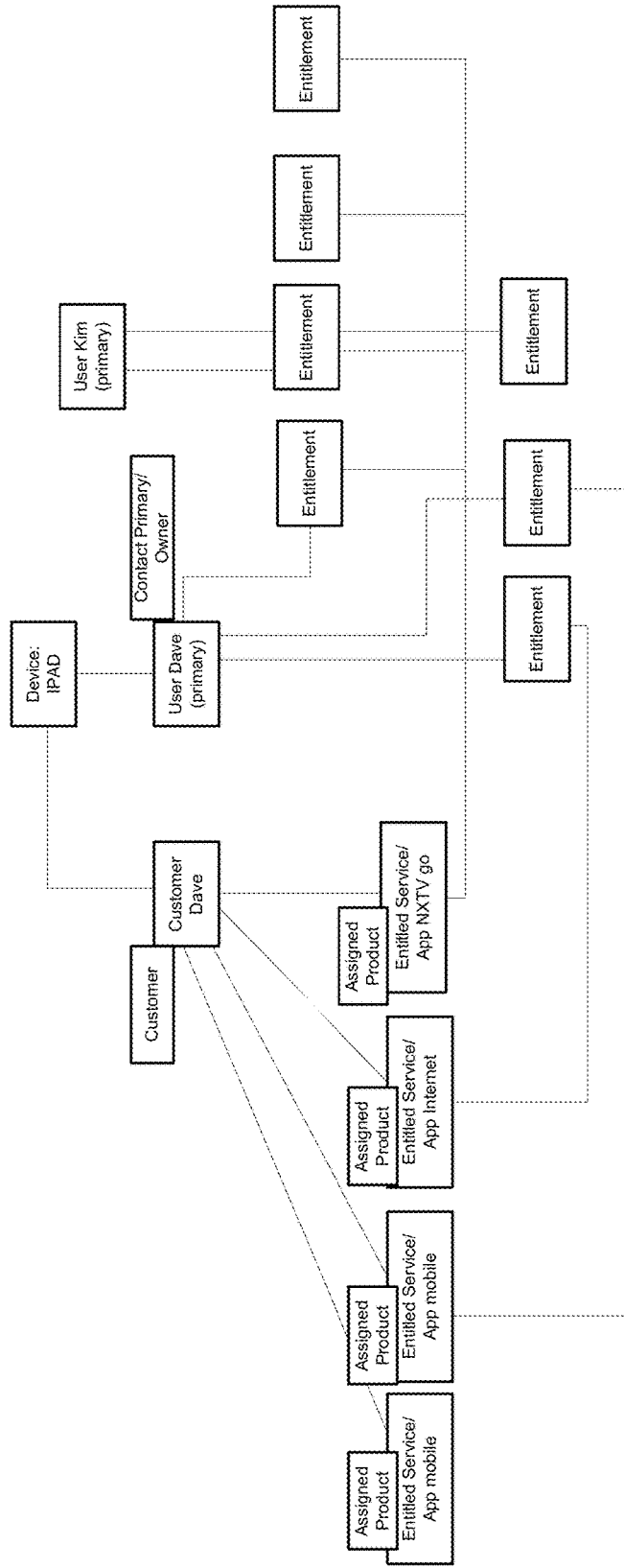
FIG. 7 shows an example of a created object model in a system, in accordance with one embodiment.

FIG. 7 shows an example 700 of a created object model in a system, in accordance with one embodiment. As an option, the example 700 may be implemented in the context of the details of the previous figures and/or any subsequent figure(s). Of course, however, the example 700 may be implemented in the context of any desired environment. Further, the aforementioned definitions may equally apply to the description below.

As shown, the object model may link one or more devices and various entitlements to one or more users.

Figure 8:
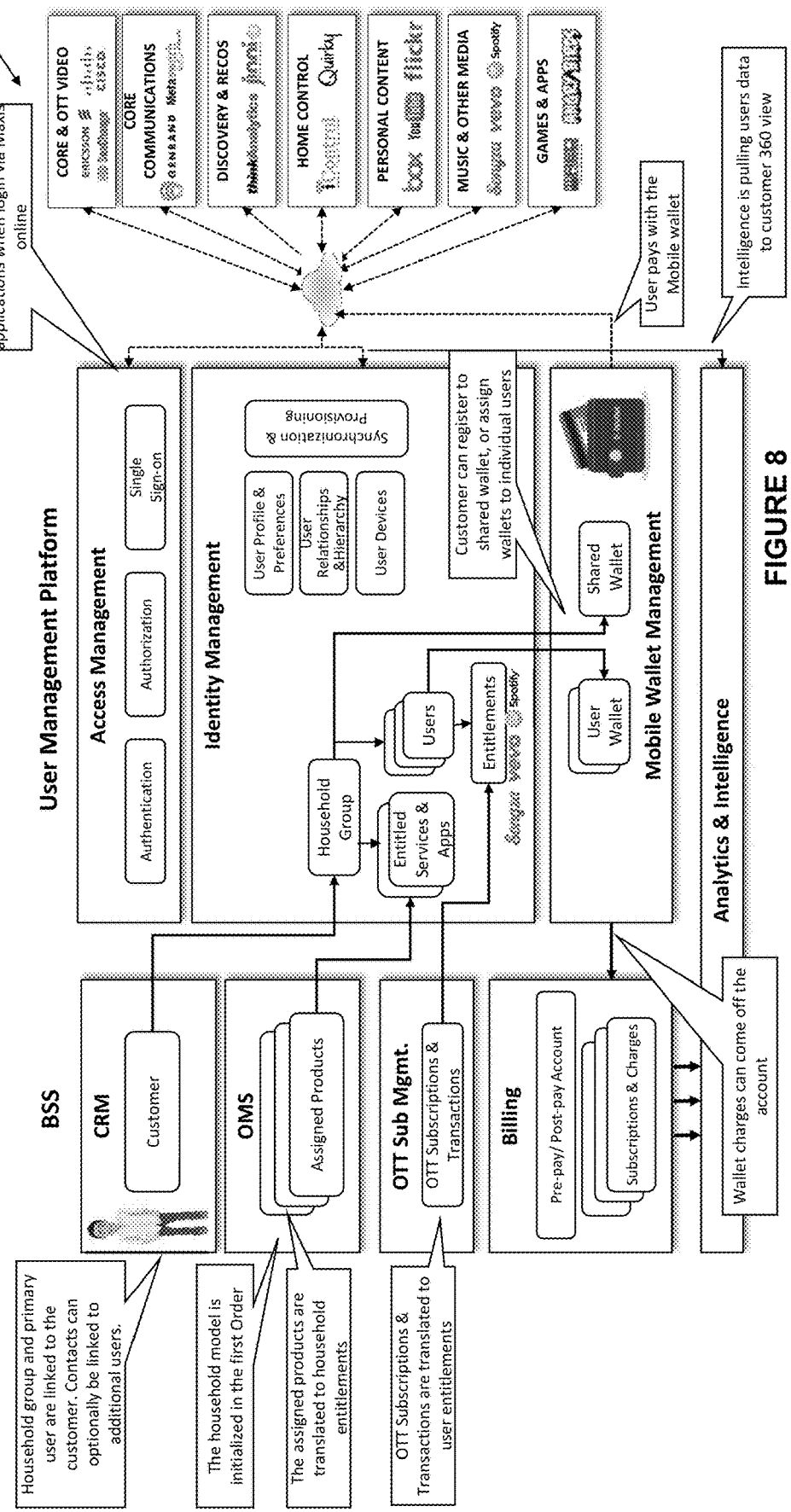
FIG. 8 shows a system diagram for managing a plurality of heterogeneous services and/or a plurality of heterogeneous devices linked to at least one customer, in accordance with one embodiment.

FIG. 8 shows a system diagram 800 for managing a plurality of heterogeneous services and/or a plurality of heterogeneous devices linked to at least one customer, in accordance with one embodiment. As an option, the system diagram 800 may be implemented in the context of the details of the previous figures and/or any subsequent figure(s). Of course, however, the system diagram 800 may be implemented in the context of any desired environment. Further, the aforementioned definitions may equally apply to the description below.

In operation, a household group and primary user may be linked to the customer. Contacts can optionally be linked to additional users. The household model may be initialized in the first order. The assigned products may be translated to household entitlements.

Further, OTT subscriptions and transactions may be translated to user entitlements. Additionally, wallet charges can come off the account. For example, a user may with a mobile wallet.

Figure 9:
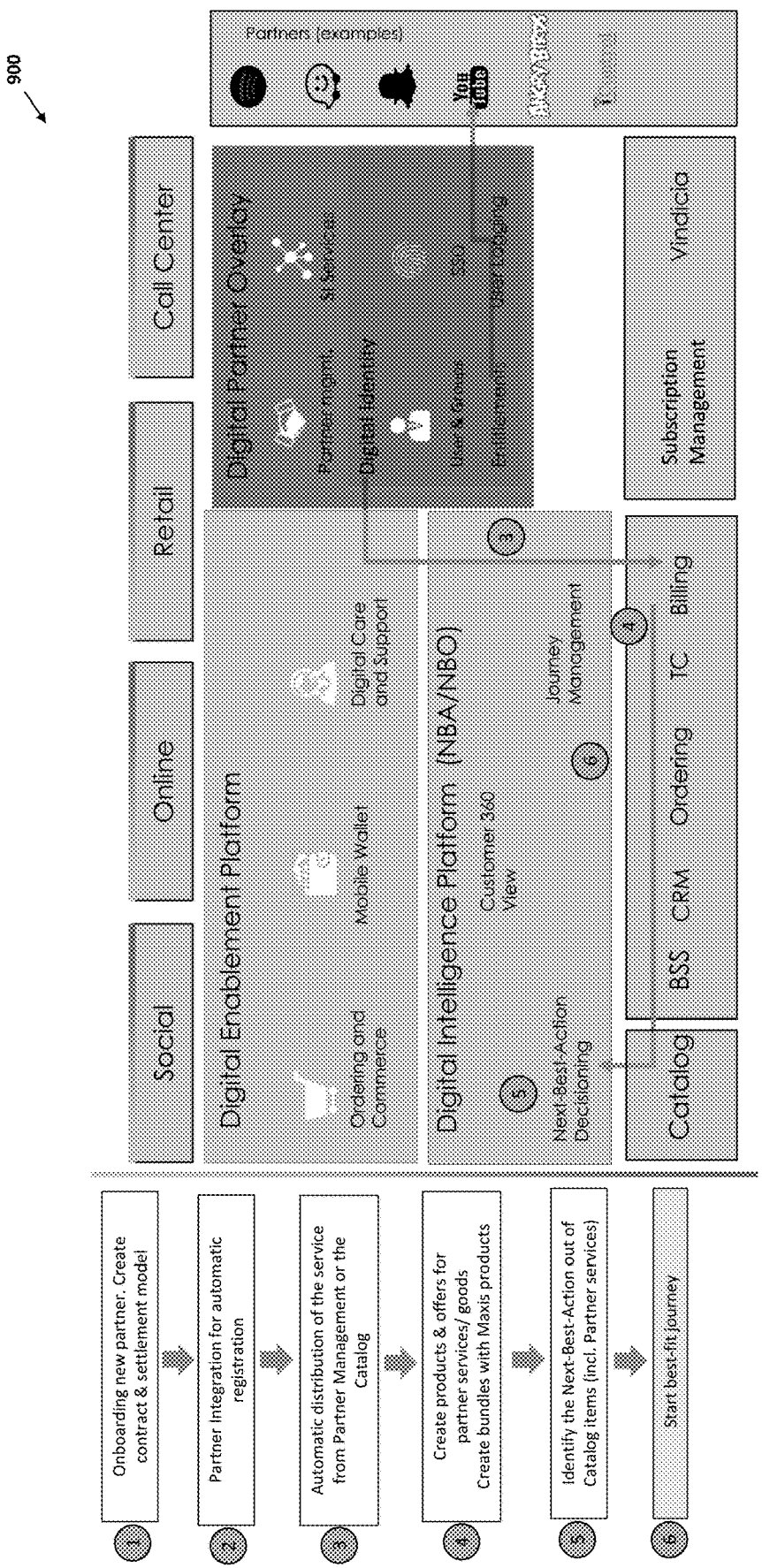
FIG. 9 shows a system flow diagram for partner on-boarding, in accordance with one embodiment.

FIG. 9 shows a system flow diagram 900 for partner on-boarding, in accordance with one embodiment. As an option, the system flow diagram 900 may be implemented in the context of the details of the previous figures and/or any subsequent figure(s). Of course, however, the system flow diagram 900 may be implemented in the context of any desired environment. Further, the aforementioned definitions may equally apply to the description below.

As a first step, the system onboards a new partner and creates a contract and settlement model. As a second step, the system performs partner integration for automatic registration.

As a third step, the system performs automatic distribution of the service from partner management or the catalog. As a fourth step, the system creates products and offers for partner services/goods. The system also creates bundles with certain products.

As a fifth step, the system identifies the Next-Best-Action out of catalog items (including partner services). Further, as a sixth step, the system starts a best-fit journey.

Figure 10:
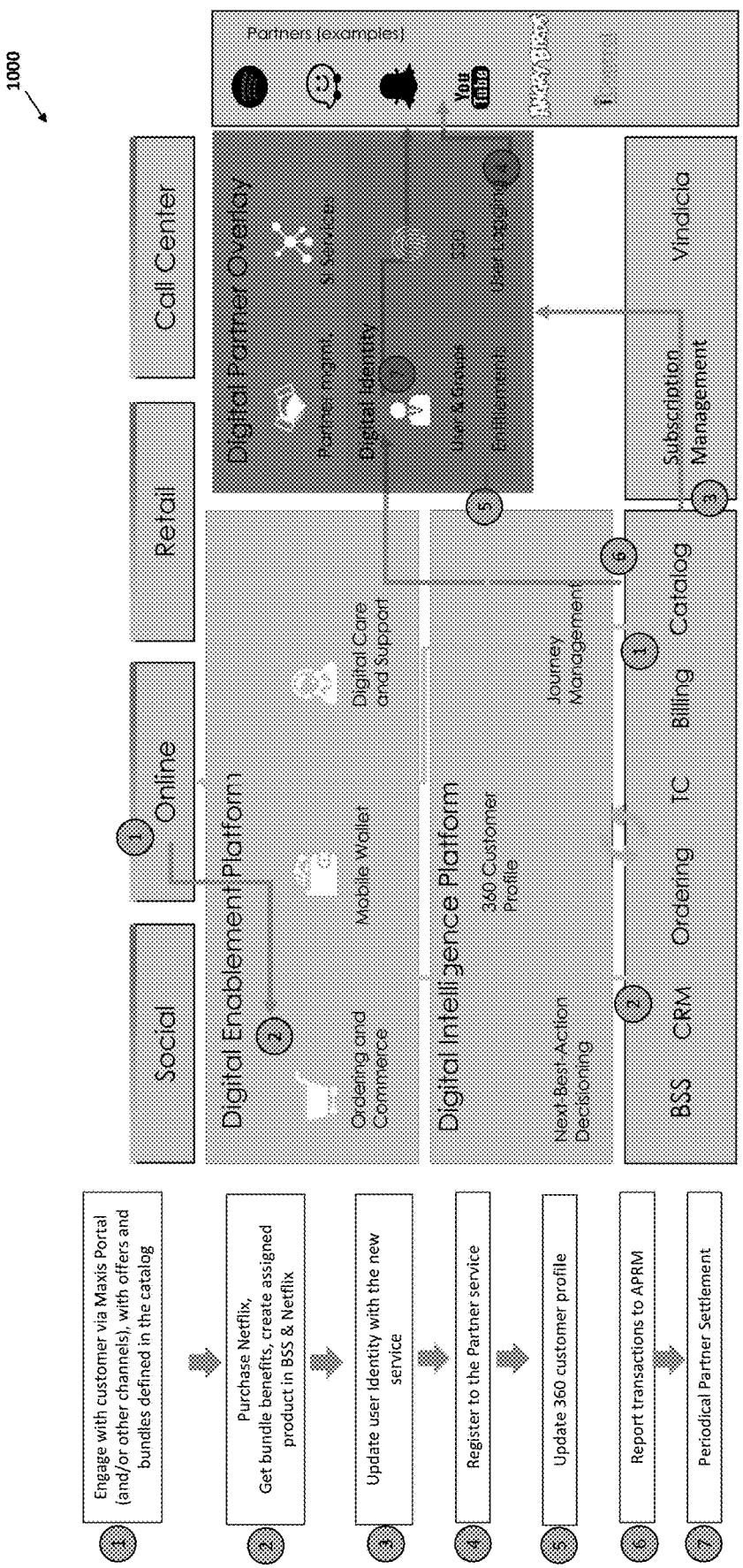
FIG. 10 shows a system flow diagram for user commerce and settlement, in accordance with one embodiment.

FIG. 10 shows a system flow diagram 1000 for user commerce and settlement, in accordance with one embodiment. As an option, the system flow diagram 1000 may be implemented in the context of the details of the previous figures and/or any subsequent figure(s). Of course, however, the system flow diagram 1000 may be implemented in the context of any desired environment. Further, the aforementioned definitions may equally apply to the description below.

As shown, the system engages with a customer via an application portal (and/or other channels), with offers and bundles defined in the catalog. Upon a purchase of a service (e.g. of Netflix, etc.), the system obtains bundle benefits and creates assigned products in BSS and the service (e.g. Netflix, etc.). The system updates a user identity with the new service. The system also registers to the partner service.

Further, the system updates a 360 degree customer profile, reports transactions to APRM, and performs periodical partner settlements.

Figure 11:
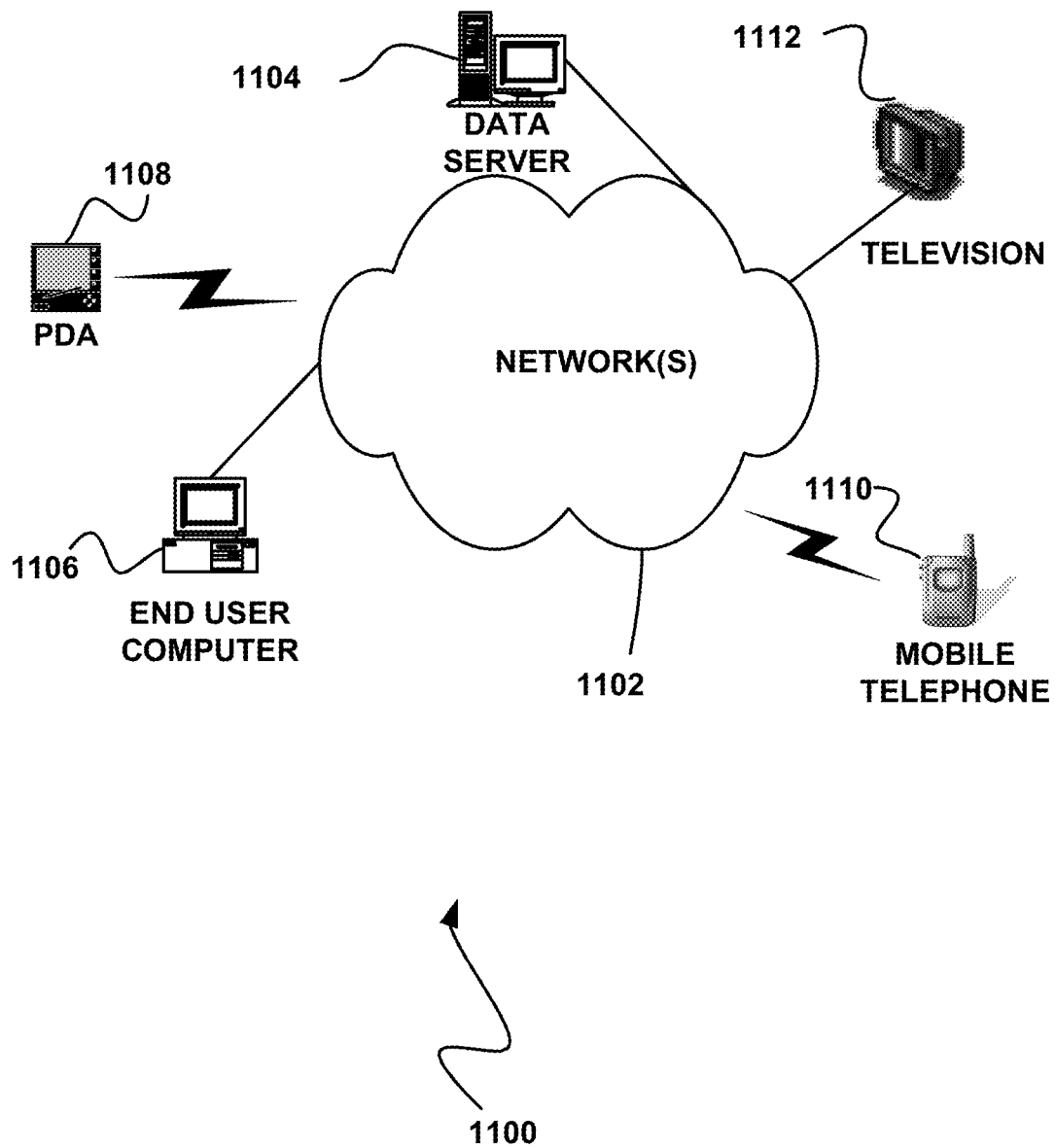
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
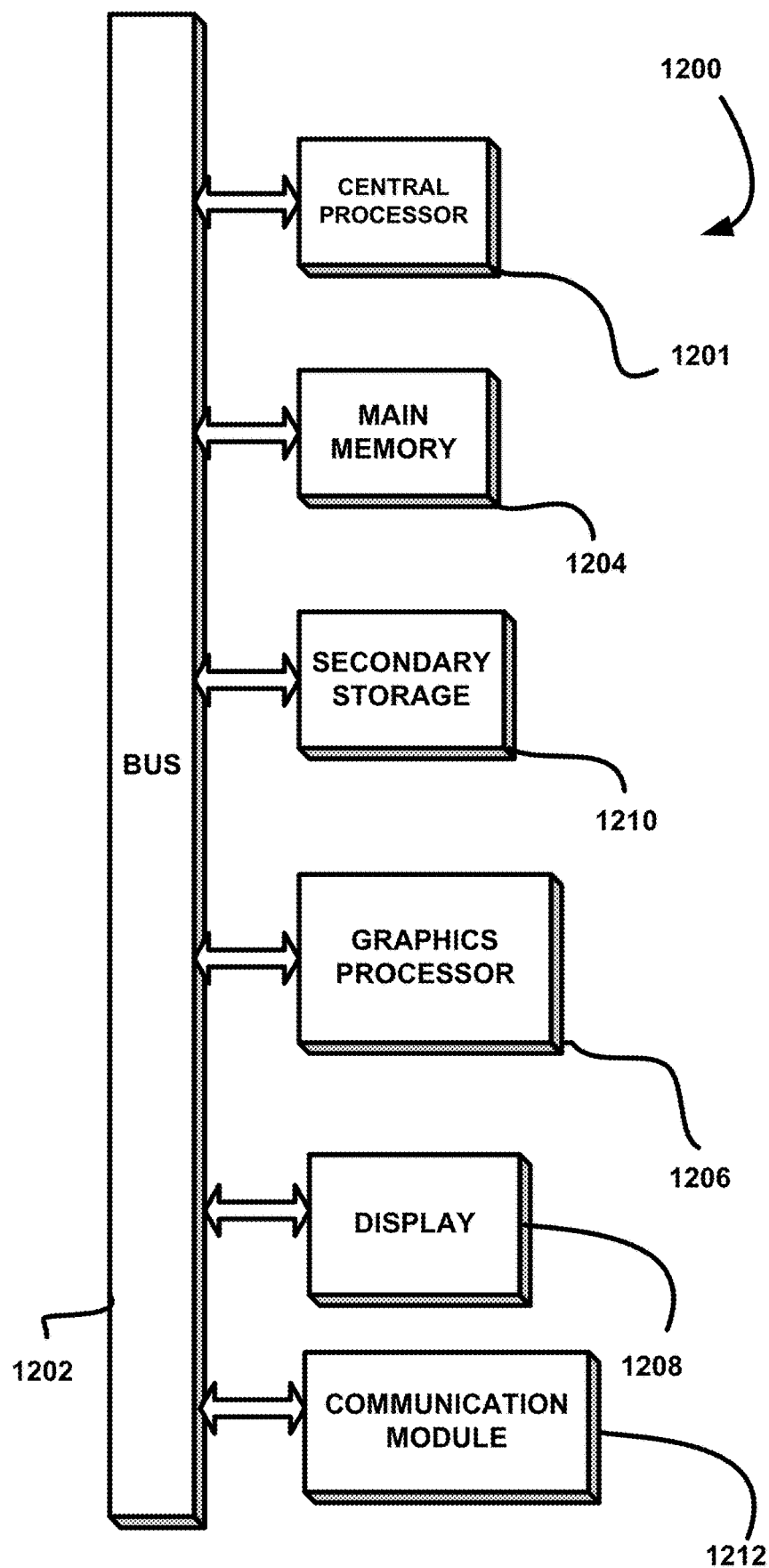
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

The system 1200 may also include one or more communication modules 1212. The communication module 1212 may be operable to facilitate communication between the system 1200 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    linking, by a management system, a customer identifier of a customer with:
    a plurality of heterogeneous services provided by different providers,
    a plurality of heterogeneous devices that are end user devices of the customer,
    a plurality of locations associated with the customer, and
    a plurality of policies; and
    communicating, by the management system via at least one network, with the plurality of heterogeneous services and the plurality of heterogeneous devices linked to the customer for managing the plurality of heterogeneous services and the plurality of heterogeneous devices in association with the plurality of locations and the plurality of policies, including:
    upon an attempted login to one of the heterogeneous services by the customer, performing, by the management system, authentication of the customer, wherein the authentication is performed by an access manager application that links the customer identifier of the customer with the plurality of heterogeneous services, the plurality of heterogeneous devices, the plurality of locations, and the plurality of policies, and wherein the authentication performed by the access manager application includes:
    sending a temporary password to the customer,
    receiving an input for the temporary password from the customer,
    verifying the input, and
    verifying that a device of the customer is registered,
    responsive to the authentication, receiving, from the customer by the management system, information for a single sign on, and
    signing the customer into one or more heterogeneous services of the plurality of heterogeneous services, by the management system, using the information, wherein the one or more heterogeneous services to which the customer is signed in is separate from the access manager application.

2. The method of claim 1, wherein the customer identifier includes one or more of a username, a password, and biometric information.

3. The method of claim 1, wherein the plurality of heterogeneous services include one or more of television services, Internet services, streaming media services, gaming services, and security services.

4. The method of claim 1, wherein the plurality of heterogeneous devices include one or more of connected home devices, security devices, mobile phones, tablet computers, computers, and vehicles.

5. The method of claim 1, wherein the plurality of locations includes a first home location and a second home location.

6. The method of claim 1, wherein the plurality of heterogeneous services are associated with the plurality of heterogeneous devices.

7. The method of claim 1, wherein the management system tracks a maximum number of users per heterogeneous service of the plurality of heterogeneous services for use by the management system in restricting a number of entitlements for each heterogeneous service.

8. The method of claim 1, wherein each heterogeneous service of the plurality of heterogeneous services is automatically assigned to a primary user of the customer upon purchase of the heterogeneous service by the customer.

9. The method of claim 1, further comprising:
    upon a user of the customer logging in to an application of the management system, presenting to the user the linked plurality of heterogeneous services and plurality of heterogeneous devices.

10. The method of claim 1, wherein the plurality of locations include locations to which the plurality of heterogeneous services are connected.

11. The method of claim 1, wherein relationships between the plurality of locations and the plurality of devices is stored by the management system, and wherein each relationship is created in ordering when a service address is created on an assigned product.

12. The method of claim 1, wherein managing the plurality of heterogeneous services and the plurality of heterogeneous devices in association with the plurality of locations and the plurality of policies includes managing user access to combinations of the plurality of heterogeneous services, the plurality of heterogeneous devices, and the plurality of locations.

13. A computer program product embodied on a non-transitory computer readable medium, comprising computer code for:
    linking, by a management system, a customer identifier of a customer with:
    a plurality of heterogeneous services provided by different providers,
    a plurality of heterogeneous devices that are end user devices of the customer,
    a plurality of locations associated with the customer, and
    a plurality of policies; and
    communicating, by the management system via at least one network, with the plurality of heterogeneous services and the plurality of heterogeneous devices linked to the customer for managing the plurality of heterogeneous services and the plurality of heterogeneous devices in association with the plurality of locations and the plurality of policies, including:
    upon an attempted login to one of the heterogeneous services by the customer, performing, by the management system, authentication of the customer, wherein the authentication is performed by an access manager application that links the customer identifier of the customer with the plurality of heterogeneous services, the plurality of heterogeneous devices, the plurality of locations, and the plurality of policies, and wherein the authentication performed by the access manager application includes:

sending a temporary password to the customer,
receiving an input for the temporary password from the customer,
verifying the input, and
verifying that a device of the customer is registered,
responsive to the authentication, receiving, from the customer by the management system, information for a single sign on, and
signing the customer into one or more heterogeneous services of the plurality of heterogeneous services, by the management system, using the information, wherein the one or more heterogeneous services to which the customer is signed in is separate from the access manager application.

14. A management system, comprising one or more processors, operable for:
 linking, by the management system, a customer identifier of a customer with:
 a plurality of heterogeneous services provided by different providers,
 a plurality of heterogeneous devices that are end user devices of the customer,
 a plurality of locations associated with the customer, and
 a plurality of policies; and
 communicating, by the management system via at least one network, with the plurality of heterogeneous services and the plurality of heterogeneous devices linked to the customer for managing the plurality of heterogeneous services and the plurality of heterogeneous devices in association with the plurality of locations and the plurality of policies, including:
 upon an attempted login to one of the heterogeneous services by the customer, performing, by the management system, authentication of the customer, wherein the authentication is performed by an access manager application that links the customer identifier of the customer with the plurality of heterogeneous services, the plurality of heterogeneous devices, the plurality of locations, and the plurality of policies, and wherein the authentication performed by the access manager application includes:
 sending a temporary password to the customer,
 receiving an input for the temporary password from the customer,
 verifying the input, and
 verifying that a device of the customer is registered,
 responsive to the authentication, receiving, from the customer by the management system, information for a single sign on, and
 signing the customer into one or more heterogeneous services of the plurality of heterogeneous services, by the management system, using the information, wherein the one or more heterogeneous services to which the customer is signed in is separate from the access manager application.

15. The system of claim 14, wherein the customer identifier includes one or more of a username, a password, and biometric information.

16. The system of claim 14, wherein the plurality of heterogeneous services include one or more of television services, Internet services, streaming media services, gaming services, and security services.

17. The system of claim 14, wherein the plurality of heterogeneous devices include one or more of connected home devices, security devices, mobile phones, tablet computers, computers, and vehicles.

* * * * *